United States Patent [19]

Otto

[11] Patent Number: 4,976,180
[45] Date of Patent: Dec. 11, 1990

[54] REVOLVING CUTTING PRESS

[75] Inventor: Gerhard Otto, Alfeld, Fed. Rep. of Germany

[73] Assignee: C. Behrens AG, Alfeld, Fed. Rep. of Germany

[21] Appl. No.: 201,070

[22] Filed: May 9, 1988

[30] Foreign Application Priority Data

Jun. 24, 1987 [DE] Fed. Rep. of Germany ....... 3720777

[51] Int. Cl.$^5$ .............................................. B26D 5/02
[52] U.S. Cl. ....................................... 83/133; 83/552; 83/620
[58] Field of Search ................. 83/552, 620, 133, 140, 83/143

[56] References Cited

U.S. PATENT DOCUMENTS

| | | | |
|---|---|---|---|
| 3,527,130 | 9/1970 | Knehans | 83/552 X |
| 3,613,490 | 10/1971 | Bredow | 83/552 X |
| 3,685,380 | 8/1972 | Daniels | 83/552 |
| 4,412,469 | 11/1983 | Hirata et al. | 83/552 |
| 4,532,845 | 8/1985 | Jinnouchi | 83/552 |
| 4,569,267 | 2/1986 | Klingel | 83/552 |

FOREIGN PATENT DOCUMENTS 253547  2/1970  U.S.S.R. ................................. 83/552

Primary Examiner—Frank T. Yost
Assistant Examiner—Eugenia A. Jones
Attorney, Agent, or Firm—Michael J. Striker

[57] ABSTRACT

A revolving cutting press comprises at least one rotatable supported revolving plate having a peripheral region provided with a plurality of tool receptacles which are formed for receiving tool sets and are spaced from one another, a working station arranged so that any of the tool sets can be transferred to the working station during rotation of the revolving plate, a plunger which can be coupled with the tool set in the working station, and a tool magazine containing at least two tool receptacles for tool sets and arranged in the peripheral region of the revolving plate so that tool magazine is supported on the revolving plate and movable relative to the revolving plate, and any of the tool sets which are held in the tool magazine can be transferred to the working station and coupled with the plunger.

19 Claims, 4 Drawing Sheets

REVOLVING CUTTING PRESS

BACKGROUND OF THE INVENTION

The present invention relates to a revolving cutting press, and more particularly to such a revolving cutting press which has at least one rotatable revolving plate, with a plurality of tool receptacles for tool sets in its peripheral region, and a working station arranged so that any of the tool sets can be transferred to the working station during rotation of the revolving plate and coupled with a plunger.

Revolving cutting presses of the above-mentioned general type are known in the art. They are used as machines for working plate-shaped workpieces in numerous forms. Generally they have two revolving plates which are arranged over one another and provided in their peripheral region with complete tool sets. The tool set can be formed of an upper tool which includes at least a punch holder with a punch, and a lower tool which includes a matrix. In addition, a stripper is provided for facilitating a withdrawal of the punch from the workpiece after punching or cutting process.

The substantial advantage of these revolving cutting presses is that it is possible to provide a very fast exchange of the tool set which is located in the working station, by pure rotation of the revolving plate. On the other hand, the tool capacity of the known revolving cutting presses is practically limited by the structural size of the revolving plates. Also, in the sense of the achievable tool exchange with this progressive increase of the radii of the revolving plates, respective power increase of their rotary drives is required since the increase in radii leads to overproportionally increased inertia moments.

U.S. Pat. No. 3,685,380 discloses a revolving cutting press with the revolving plates which support the tool sets arranged along several circles which are concentric to the axis of the plate. In correspondence with the number of the circles, an increase of the tool reservoir is achieved. However, the tool sets which are arranged especially on the inner circle are accessible with difficulties so that their exchange is considerably complicated. A further disadvantage of this construction is that during a transfer of the tool sets from one to the other circle a respective subsequent movement of the tool is required.

The German document DE-OS No. 3,241,046 shows special constructions of punching tools, in which those parts of punch are engaged with the workpiece which are selected by actuation of a cam disc. The disadvantage of this approach is that no standard punch tools can be used and a stripper which narrowly surrounds the punch must be dispensed with. Finally, this embodiment possesses the same above-described disadvantage in that depending on the respective punch part for engagement, the coordinate position of the workpiece must be constantly changed. This increases the dead time which occurs during working of a workpiece. Finally, the application of the above-mentioned tool is limited to relatively thin sheets.

SUMMARY OF THE INVENTION

Accordingly, it is an object of the present invention to provide a revolving cutting press of the above-mentioned general type, which is designed for avoiding the disadvantages of the prior art so that its tool reservoir is increased without negatively affecting the working of workpiece and the tool exchange and also without complicating the accessibility of the individual tool sets.

In keeping with these objects and with others which will become apparent hereinafter, one feature of the present invention resides, briefly stated in that one or several additional tool magazines are arranged in the peripheral region of the revolving plate or revolving plates for joint rotation with the latter, and the additional tool magazine or magazines are driveable relative to the revolving plates and provided with several complete tool sets.

Since the additional tool magazines are arranged in the peripheral region of the revolving plates, their tool exchange for inspection and exchange purposes is easily accessible. The revolving plates in accordance with the present invention are therefore provided in the peripheral region with conventional tool sets on the one hand, and also with one or several tool magazines on the other hand.

It is further possible to design or arrange the tool magazines on the revolving plates so that any tool set which is accommodated in it can be coupled with the plunger, namely with the punch drive of the revolving cutting press. In this manner it is achieved that during exchange of the tool located in the working station the coordinate position of the workpiece must not be changed since the engagement between the workpiece and the new tool is produced at the same location. Since any tool sets of the tool magazine can be coupled with the above-mentioned plunger, it is simultaneously achieved that during reconstruction of conventional revolving cutting presses with the solution in accordance with the present invention, no adjustment works must be performed with the plunger which actuates both the tool sets arranged in the tool magazine and the remaining tool sets arranged in the revolving plates. Finally, the tool receptacles of the tool magazine and the remaining tool receptacles of the revolving plates can be formed so that standard tools can be inserted in them. The tool magazine cooperates with a respective positioning drive which moves the tool magazine relative to the revolving plate in a predetermined manner for coupling with a predetermined tool set on the plunger.

In accordance with a further feature of the present invention the tool magazine is designed so that it can be directly coupled with the plunger of the revolving cutting press and moves with it as a whole, while the punch holders of the tool sets which are located outside a working position are held in their rest position during a downward movement of the plunger. An arresting element is provided on the revolving plate for fixing both the working position of a tool set located in the tool magazine and also the rest position of the remaining tool sets. Since the tool magazine as a whole is moved by the plunger and however the tool sets located outside a working position are retained, a very simple and easy construction is produced. Moreover, the tool magazine is designed so that a coupling on the plunger is performed during its movement relative to the revolving plate.

In accordance with an especially advantageous feature of the present invention, the tool magazine is designed as an insertion plate which can be compared with a small revolving plate. The axis of the insertion plate lies on a circle which is concentric with the axis of the revolving plate itself, and the axes of the remaining tool sets of the revolving plate lie on the same circle. One or several such insertion plates can be used, which receive on their periphery a predetermined number of the tool sets. Thereby, depending on the number of the insertion plates, the total tool sets reservoir which is available for working is considerably increased as compared with a conventional revolving cutting press. Because of the arrangement of the insertion plate, it can be brought to such a rotary angle position that at least one tool set which is held in the insertion plate is located exactly on the above-mentioned circle, and the circle corresponds to a geometrical position of the plunger so that a coupling of this tool set with the plunger is possible. An exchange of a tool set which is located in an insertion plate by another tool set located in the same insertion plate, can be performed with a low energy consumption in the shortest time because of the low mass of the insertion plate. The tool receptacles along the periphery of the insertion plate can be arranged in uniform or non-uniform distribution. In the latter case, the tool receptacles have different diameters.

In accordance with a further feature of the present invention, the insertion plates which are associated with the upper and lower revolving plates are arranged in openings of the upper or lower revolving plates or a matrix shoe and formed as substantially cylindrical bodies. In an inventive manner, the element which is available on the revolving plate for fixing the height of the remaining tool sets outside the working station is also used for fixing the height position of the insertion plate. This element is formed in a simplest case as a circular holding plate whose boundary serves as abutment surface. Therefore, it is no longer necessary to provide a special element only for the fixation of the position of the insertion plate.

Still another advantageous feature of the present invention is that in the inventive cutting press despite the plurality of tool sets in one insertion plate, the stripper which during cutting and punching process narrowly surrounds a punch to be used is not dispensed with. In the rest position all punches of an insertion plate extend in openings of the stripper which is rotatably arranged on a stripper shoe, therefore it is not necessary to provide a special rotary drive for the stripper which in this manner is form-lockingly coupled with the rotary movement of the insertion plate.

Still a further feature of the present invention is that the insertion plate can be coupled with a rotary drive so that the rotary drive can be arranged stationarily and does not interfere with the rotary movement of the revolving plate. Through the rotary drive, all positioning and arresting functions in the coupled condition are taken over. In a non-coupled condition only a base position of the insertion plate is secured. For producing a coupling of the rotary drive with the insertion plate, it can be provided with an outer teething cooperating with the rotary drive. The connection of the rotary drive with insertion plate can also be performed indirectly with interposition of a transmission.

The rotary drive can be arranged in accordance with an advantageous embodiment on a machine base body of the revolving cutting press turnably but in other aspects immovably relative to the base body. The coupling of the rotary drive with the upper or lower insertion plate or uncoupling from them can be thereby performed by simple turning of a beam which cooperate at both sides with a pressure medium actuated cylinder-piston unit.

The coupling of the rotary drive with the insertion plates can be performed in different ways, for example in a friction-transmitting manner.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
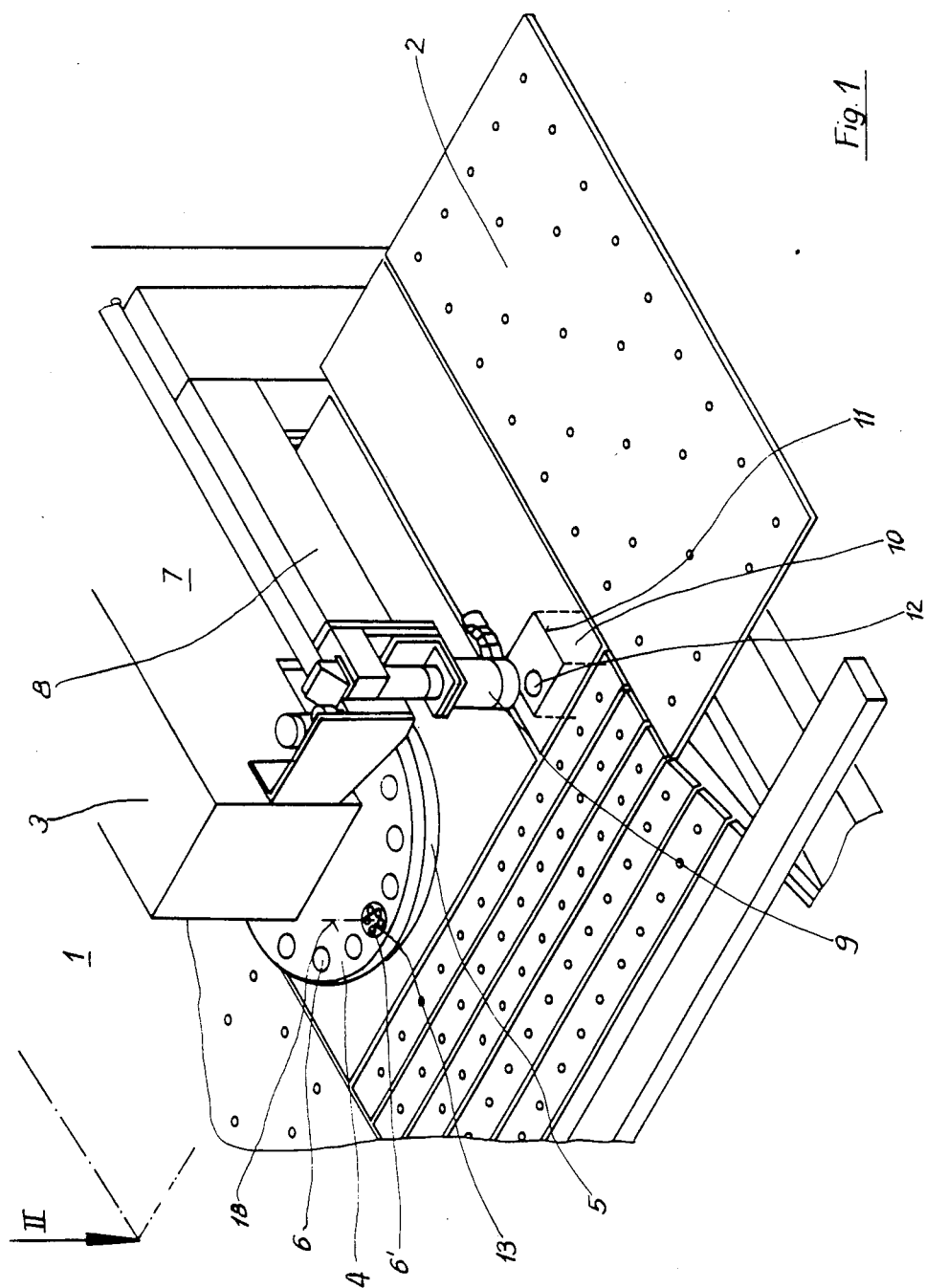
FIG. 1 is a perspective view of a revolving cutting press in accordance with the present invention.

A revolving cutting press as a whole is identified in FIG. 1 with reference numeral 1. It cooperates with a coordinate table 2. A plate-shaped workpiece to be worked is positioned in the plane of the coordinate table in a known manner relative to a working station which is not shown in FIG. 1.

The revolving cutting press includes a vertically extending C-shaped machine base body 3 which has two legs arranged so that respectively an upper and a lower revolving plate 4, 5 is located between the legs rotatable about a vertical axis. The revolving plates are rotatable by definite angular steps by means of a not shown drive device about the above-mentioned axis and carry at their periphery a plurality of complete tool sets 6 which are schematically shown in FIG. 1. Each tool set includes an upper tool inserted in the upper revolving plate 4 and a lower tool inserted in the lower revolving plate 5 and cooperating with the upper tool. The tools will be explained in detail later on.

A beam 8 extends parallel to the upper leg 7 of the machine body 3 and carries a laser cutting device 9. The cutting device cooperates in a known manner with a laser shaft 10. The laser shaft 10 forms an approximately square opening 11 in the plane of the coordinate table 2. The parts which are cut out from the plate of the workpiece are removable through this opening. The laser shaft 10 is closed from above by a circular opening 12 and for example is formed vertically lowerable, so that the opening 11 is opened in the plane of the coordinate table 2. The laser cutting device forms an additional cutting tool associated with the revolving cutting press, for working of plate-shaped workpieces placed on the coordinate table 2. It operates with the laser beam in the region of the opening 12, so that the part which is cut out from the workpiece and whose extension is smaller than the opening 11 is removed by lowering of the laser shaft 10 from the plane of the coordinate table 2 and withdrawn. The laser cutting device is a cutting tool which operates independently from the respective tool sets of the revolving plates 4 and 5.

An insert plate in accordance with the present invention is shown schematically and identified with reference numeral 13. It is arranged in a peripheral region of the upper revolving plate 4 on the place provided for the tool set 6. The insert plate 13 is supported rotatably relative to the upper revolving plate 4 about a vertical axis 18. The insert plate 13 supported in the upper revolving plate 4 is located opposite to a further insert plate 13′ which is supported in the lower revolving plate 5 and shown in FIG. 3. The insert plates 13 and 13′ which are rotatable about the vertical axis 18 by definite angular steps from a motor drive carry on their periphery a plurality of complete tool sets 6′. The insert plate 13 associated with the upper revolving plate 4 carries a respective upper tool, while the insert plate 13′ associated with the lower revolving plate carries a respective lower tool. When a set of such insert plates is located in the region of the working station of the revolving cutting plates, there is a possibility in accordance with the present invention to provide a tool exchange by pure rotation of the insert plate. This will be explained in detail hereinbelow.

Figure 2:
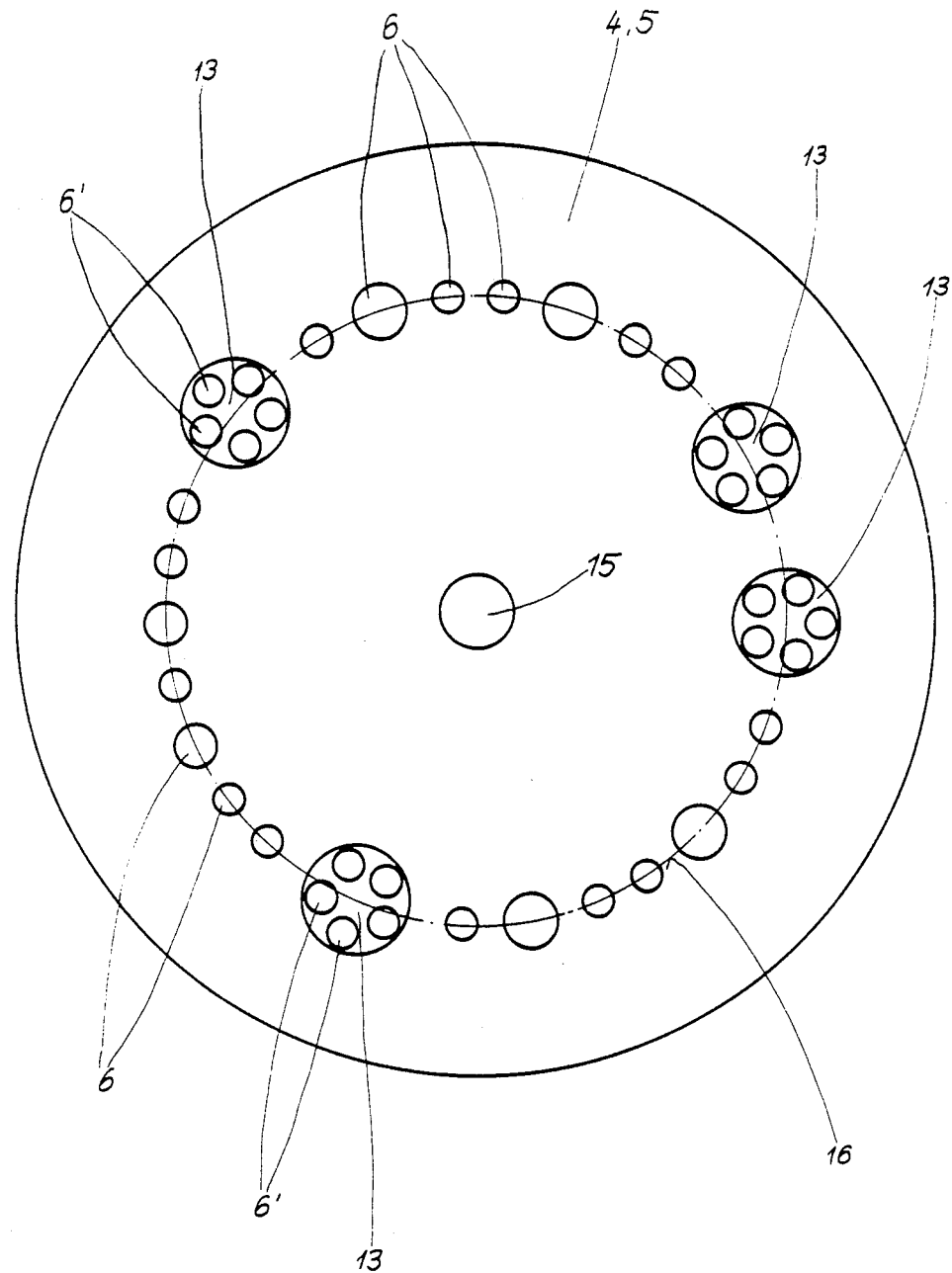
FIG. 2 is a plan view of a revolving plate of the inventive revolving cutting press, and particularly in a plane II.
Figure 3:
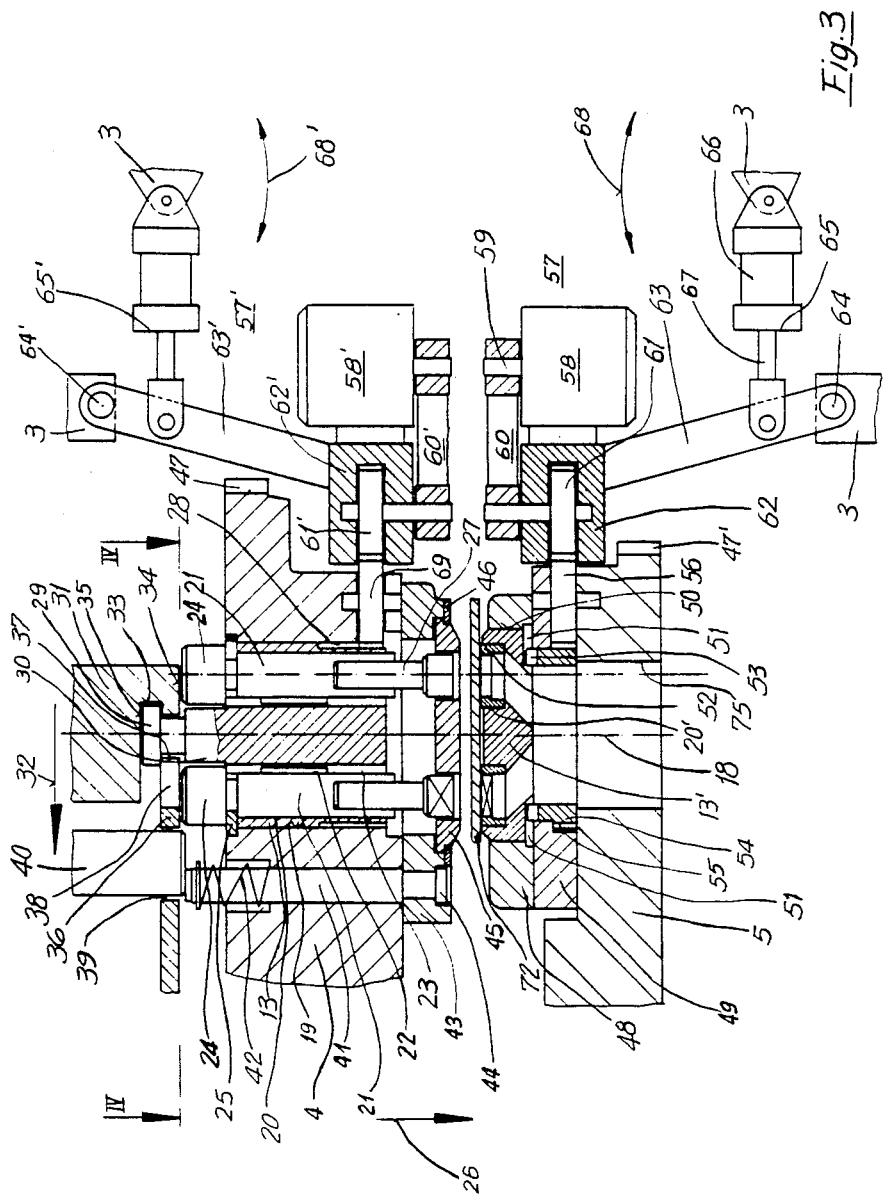
FIG. 3 is a view showing a peripheral end region of two revolving plates located one above the other, in a vertical section.
Figure 4:
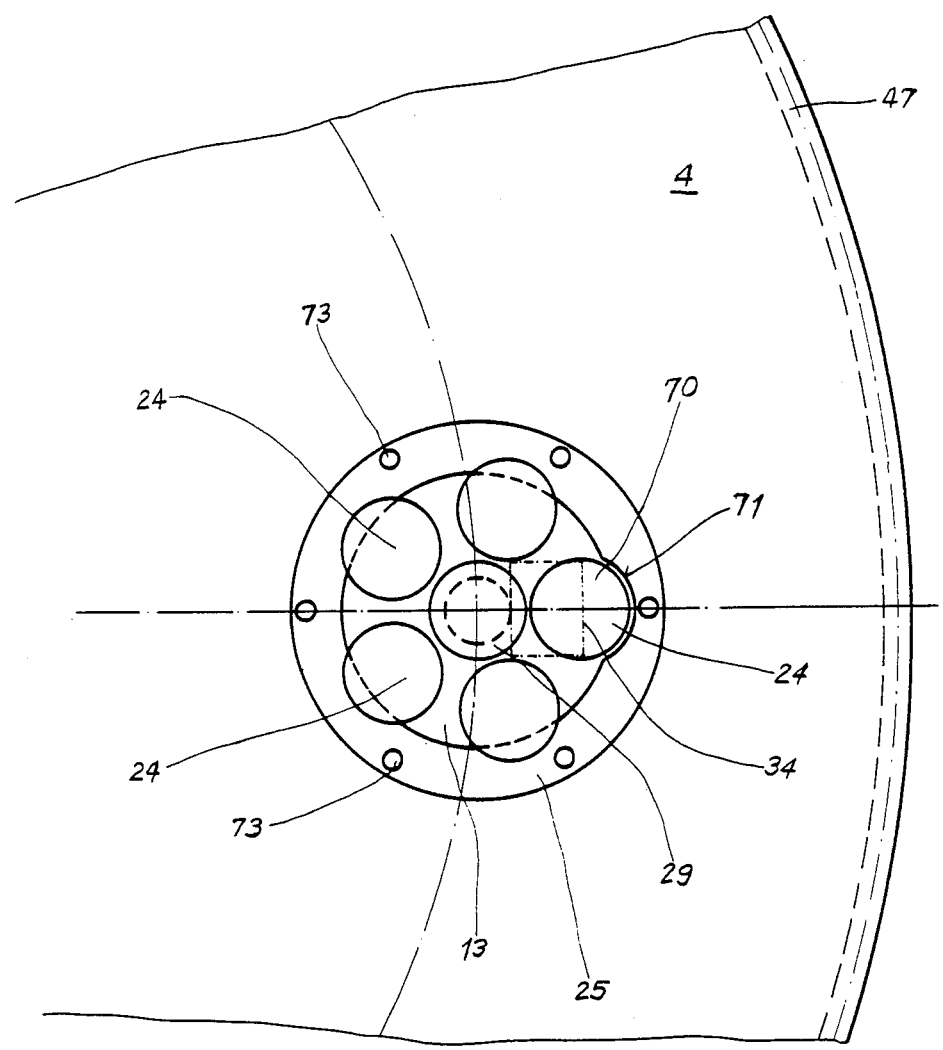
FIG 4 is a view showing a section taken in a plane IV—IV in FIG. 3.

In FIGS. 2-4 functional elements which correspond to the elements shown in FIG. 1 are identified with the same reference numerals.

As can be seen from FIG. 2, the revolving plates 4, 5 are provided with several insert plates 13 which are arranged on a circular line 16 extending concentrically to the axis 15 of the revolving plates 4, 5. The central points of the remaining tool sets 6 are also located on this line. The tool sets are schematically shown by circles of different diameters which must illustrate their different nature.

Each insertion plate 13 carries five tool sets 6′ which naturally can be of a different nature. It is to be understood from the schematic showing that by the arrangement of such insert plates the tool reservoir which is available for mechanical working can be significantly increased.

FIG. 3 shows a vertical section of the structure as well as the drive of the insertion plate 13 of the upper revolving plate 4 and 13′ of the lower revolving plate 5.

Both insertion plates 13, 13′ are supported rotatably about the axis 18 which extends perpendicularly to the revolving plates 4, 5. The upper insertion plate 13 is formed as a substantially cylindrical body which is inserted in an opening 19 of the upper revolving plate. The insertion plate 13 is provided with individual openings 20 which are arranged concentrically and each provided for receiving a punch holder 21. The punch holders are inserted non-rotatably in the openings 20 and for this purpose provided with adjusting springs 22 which are in engagement with grooves 23 of the openings 20.

The punch holders 21 are provided at the upper side with punch holder heads 24. The latter abut against a holding ring 25 arranged on the revolving plate 4. Thereby the punch holder heads 24 are fixed in the vertical direction, in other words in direction of the arrow 26.

Punches 27 are mounted in a known manner on the punch holders 21. The connection of the punch holders and the punches are not shown in the drawings. The system including the punch holder 21 and the punch 27 can also be formed as a standard tool.

The insertion plate 13 is provided in its lower outer peripheral region with an outer toothing 28. This toothing serves for driving the insertion plate in rotation about the axis 18 as will be explained in detail hereinbelow.

A shaft end 30 provided with a holding head 29 extends upwardly from the insertion plate 13, coaxially with the axis 18. The holding head 29 is held in a plunger 31 in a form-locking manner. The plunger 31 is connected with a known not shown plunger drive through which the punching force required for mechanical working is applied.

The plunger 31 is formed asymmetrically in its lower region which faces toward the holding head 29. More particularly, it is formed so that the holding head 29 is received in a horizontally extending groove 33 of the plunger 31. The groove 33 opens in direction of the arrow 32. The plunger 31 has a surface 34 which serves for a pressure transmission. In the working position the surface 34 abuts against the punch holder head 24. The axial distance in the direction of the axis 18 between the surface 34 and a surface 35 of the plunger 31 which abuts against the holding head 29 is greater than the vertical stroke of the plunger. It will be explained hereinbelow.

Reference numeral 36 identifies a holding plate. The holding head 29 abuts outside of the working station against an edge 37 of the holding plate 36, the edge facing the holding head. The holding plate 36 has a recess 38 which is opposite to the working station and formed so that the plunger 31 can pass through this opening during a vertical movement in direction of the arrow 26. The holding plate 36 serves simultaneously for respective holding of the punch holder of the remaining tool sets of the revolving plate or in other words such which are not inserted in the inventive insertion plate.

The holding plate 36 which is mounted on the machine base body 3 of the revolving cutting plate is also provided with a respective number of openings 39 in the region of the working station. Stripper plungers 40 are guided in the openings 39. The lower side of the stripper plunger 40 abuts against a stripper pin 41 which abuts against a lower side of the stripper plunger 40 with a spring pre-tensioning. For this purpose the upper region of the stripper pin 41 is surrounded by a spring 42. The spring 42 is located on the one hand inside the openings of the revolving plate 4 which receive the stripper pins, and on the other hand, in a disc which is mounted on it or the like. Only one stripper pin 41 is shown in the drawing. Practically, several stripper pins can be provided which are located with uniform distribution about a tool set arranged to engage with the workpiece, or the insertion plate 13. In the drawing of FIG. 2 the right tool set is located in such a working position.

Reference numeral 43 identifies a stripper shoe. The stripper shoe is held against the lower surface of the revolving plate 4 by the lower end of the stripper pin in the movable position under the action of the spring 42 in a form-locking manner. For this purpose the lower part of the stripper pin 41 is provided with a head part 44 which abuts against the lower side of the stripper shoe 43 or the bottom of an opening provided in it. The stripper shoe 43 serves for receiving a stripper 45 which is mounted in a form-locking manner on the stripper shoe 43 with the use of a safety sheet 46. The mounting is performed so that the stripper 45 is received rotatably relative to the stripper shoe 43 about the axis 18. The rotary drive is performed by the entraining action of the punches 27 which extend in the stripper 45.

Reference numerals 47 and 47' identify toothings provided on the outer periphery of the revolving plates 4 and 5. A rotary drive of the revolving plates is performed in a known manner through these toothings.

Reference numeral 48 identifies a matrix shoe. The matrix shoe is mounted on the lower revolving plate 5 in a known and not shown manner. The mounting is performed with interposition of a matrix shoe support 49.

The matrix shoe 48 is provided at its upper side with an opening 50. The substantially cylindrically formed insertion plate 13' is rotatably received in the opening 50. The insertion plate 13' is provided with two diagonally opposite grooves 51 in its lower side in a peripheral region. A rotary drive of the insertion plate 13' about the axis 18 is performed through the groove 51 as will be explained hereinbelow. The upper side of the insertion plate 13' is provided with a row of openings 20' which are arranged on a circle concentric to the axis 18. A matrix 52 is inserted in each opening in an non-rotatable manner. The above-mentioned openings 20' which serve for receiving the matrixes 52 are extended at their lower side by openings which are inclined to the axis 18 and merge into an opening 75 provided in the lower revolving plate 5 for discharging the punched out parts.

The above-mentioned grooves 51 are respectively in engagement with a pin 53 of a bush 54 provided with an outer toothing 55. The bush extends coaxially with the axis 18 and is in engagement with a toothed wheel 56 through the outer toothing 55. The toothed wheel 56 is rotatably supported on the revolving plate and can be brought in engagement with a rotary drive 57 which is turnably mounted on the machine frame of the revolving cutting press.

The rotary drive 57 includes a motor 58. A drive shaft 59 of the motor 58 is connected via a toothed belt transmission 60 with a toothed wheel 61. The toothed wheel 61 can in turn be coupled to the above-mentioned toothed wheel 56.

For this purpose the motor 58 and toothed belt transmission 60 are mounted on a housing 62 which receives the toothed wheel 61. The housing 62 in turn is mounted on a beam 63 which is turnable about an axis 64 extending perpendicularly to the plane of the drawing of FIG. 3. The housing 62 is mounted on the machine base body of the revolving cutting press through the beam 63.

Reference numeral 65 identifies a cylinder-piston unit. Its cylinder 66 is mounted turnably on the machine base body of the press, while its piston rod 67 is mounted turnably on the above-mentioned beam 63 with a distance from the axis 64. The cylinder-piston unit 65 is double-acting so that by its actuation the rotary drive 57 is turnable in direction of the arrow 68 about the axis 64 and thereby is coupled with or uncoupled from the toothed wheel 56.

A rotary drive associated with an upper insertion plate 13 is identified as 57'. It is designed similarly to the rotary drive 57. The rotary drive 57' includes a motor 58', a toothed belt transmission 60', a toothed wheel 61' and a housing 62' which is mounted on a beam 63'. The beam 63' is turnable about an axis 64' by means of a cylinder-piston unit 65' in direction of the arrow 68'. By this turning movement, the rotary drive 57' can be coupled with a toothed wheel 69 which is supported on the upper revolving plate 4 and in turn is in engagement with the outer toothing of the upper insertion plate 13, or it can be uncoupled from the toothed wheel 69.

The motors 58 and 58' are formed as known motors with highly accurately controllable angle of rotation. Thereby in connection with the transmission ratios between the drive shafts of these motors and the axis 18, a predetermined tool set composed of at least the punch 27 and the matrix 52 can be brought to the working position.

This working position is identified in FIG. 4 with reference numeral 70. The holding ring has here a circularly arcuate recess 71 which is formed so that the plunger 31 which extends through it, especially its surface 34 which serves for the punching force transmission, engages with the punch holder head 24 located in the working position 70 and is displaced downwardly in direction of the arrow 26 so that it is brought in engagement with a workpiece 72. During this downward movement the whole insertion plate 13 is displaced in direction of the arrow 26, and the punch holding head 24 which is located outside the working position 70 is held in its initial position, by the contour of the holding ring 25.

As can be recognized from a joint consideration of FIGS. 3 and 4, through the downwardly moving plunger 31 the whole insertion plate 13 together with the tool set which is located in the working position 70 and includes the punch holder 24 and the punch 27, is displaced in direction of the arrow 26. In contrast, the remaining respective tool set which is held in this insertion plate is not taken along with this displacement movement because of the abutment of the punch holder head 24 against the holding ring 25. It can be further recognized that the maximum displacement path of the plunger 31 is limited by the vertical distance between the surface 35 and the upper surface of the punch holder head 24. In the working position shown in FIG. 3 the holding head 29 is held exclusively in the groove 33 of the plunger 31 which is located opposite to the recess 38 in the holding plate 36 allowing a vertical movement of the plunger 31. The insertion plate 13 which is not located in the working position 70 is held in its vertical position by the holding plate 36 which is stationarily mounted on the machine base body and formed circularly up to the recess 38, so that its holding head 29 abuts against the edge of the holding plate 36.

Devices for control and measurements are not shown in the drawings. Such devices are used on the one hand for determination of the rotary angle position of the insertion plates 13 and 13' and on the other hand for transfer of a predetermined tool set to the working position 70.

In operation of the inventive revolving cutting press 1, first the workpiece 72 to be worked is displaced by means of the coordinate table 2 to a suitable position relative to the working position 70. In this operational phase the rotary drives 57 and 57' of the toothed wheel 56 and 69 are uncoupled and located in a withdrawn position, so that the rotation of the revolving plate is not prevented by the drives. It is assumed that for working of the workpiece a tool set is required which is accommodated in one of the pair of insertion plates 13 and 13'. As a result of this, the set of the insertion plates 13 and 13' is moved by the rotation of the revolving plate so that the holding head 29 of the upper insertion plate 13 is brought in engagement with the groove 33 of the plunger 31. During the rotary movement of the revolving plate the holding heads 29 of the remaining insertion plate slide over the boundary of the holding plate 36.

Now a mechanical working of the workpiece 72 can be performed by means of the plunger 31. Simultaneously with the downwardly moving plunger, also the stripper plunger 40 is actuated so that the stripper pin 41 of the stripper shoe 43 and thereby also the stripper 45 is displaced through the stripper plunger 40. The workpiece 72 is fixedly held by the stripper 45. The description of the drive of the stripper plunger 40 can be dispensed with, since it can be performed in a conventional manner. After full completion of the mechanical working, the tool set which is located in the working position 70 is withdrawn by the plunger 31 while the stripper performs its known function in stripping of the punch from the workpiece. If a further tool set located in the above-mentioned set of the insertion plates must be brought for acting on the workpiece, the system of the insertion plates must be rotated. For this purpose by respective actuation of the piston-cylinder units 65, 65', the rotary drives 57, 57' are turned in direction of the arrow 68, 68' so that an engagement between the toothed wheel pairs 61', 69 on the one hand, and 61, 56 on the other hand is provided. Finally, by respective actuation of the motors 58, 58', the respective tool set is transferred to the working position 70. During the rotation of the insertion plates 13, 13' the punch holder head 24 slips over the boundary of the holding ring 25, so that only the tool set which is located in the working position 70 is lowerable in direction of the arrow 26 by actuation of the plunger 31.

The plunger 31 as well as the holding plate 36 serve not only for holding of the insertion plate 13 but also for holding of the remaining tool sets 6 as shown in FIGS. 1 and 2. Therefore, starting from a conventional revolving cutting press, the inventive construction requires structural features in the region of the revolving plate, namely at the locations which serve for receiving the insertion plate as well as the additional mounting of the turnable rotary drive 57, 57'. Conventional revolving cutting presses can be equipped with these features in a simple manner.

It can be recognized that in correspondence with the number of the insertion plates 13, 13' the respective multiplication of tool reservoir which is available for mechanical working is possible. Since the insertion plates 13, 13' are relatively small, they can rotate very fast so that a corresponding fast tool exchange of a tool set of one insertion plate with the other tool set located in the same insertion plate is possible. Finally, the invention provides for further advantages in that the basic mechanical construction of the tool sets accommodated in the insertion plates completely correspond to the remaining tool sets. In other words, they are composed of a punch holder, a stripper, and a matrix. Therefore, standard tools can be used in the insertion plates.

It will be understood that each of the elements described above, or two or more together, may also find a useful application in other types of constructions differing from the types described above.

While the invention has been illustrated and described as embodied in a revolving cutting press, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A revolving cutting press, comprising two revolving plates arranged at an axial distance from one another and supported rotatably about a common axis, said revolving plates having a peripheral region provided with a plurality of tool receptacles which are formed for receiving tool sets and are spaced from one another; a working station arranged so that each of the tool sets can be transferred to said working station during rotation of said revolving plates; a plunger which can be coupled with the tool sets in said working station, said tool receptacles being formed as insertion plates supported rotatably relative to said revolving plates about axes which are parallel to an axis of said revolving plates, each of the tool sets which are held in said insertion plates being transferable to said working station; said plunger being coupled with each of the tool sets in said working station, the tool sets of said insertion plates in said working station being movable relative to said revolving plates between a working position in which a coupling of the tool sets with said plunger is provided and rest positions in which a coupling with said plunger is not provided; means for moving said insertion plates between said positions and including drives mounted on a machine base body to be coupled with said insertion plates or uncoupled from said insertion plates, and also operative for a rotary movement of said insertion plates relative to said revolving plates, each of said drives being formed as a motor-transmission unit, said plunger being coupleable in said working station directly with said insertion plates; means associated with said revolving plates for arresting of the tool sets of said insertion plates located outside of the working position, said axes of said insertion plates being arranged on a circle which is concentric to said axis of said revolving plates, said revolving plates including an upper revolving plate which holds an upper tool containing a punch and a punch holder for each tool set and another revolving plate which is a lower revolving plate and holds a lower tool containing a matrix for each tool set, said insertion plates including an upper insertion plate; said arresting means arranged on said machine base body and arresting said upper insertion plate and said punch holders of the tool sets in a predetermined height, said arresting means being formed as a circular holding plate with an outer boundary which is provided in said working station with a recess, so that and in the punch holder is said working station movable through said recess by said plunger.

2. A revolving cutting press as defined in claim 1, wherein each of said drives for said insertion plates is formed as a drive with highly accurately controlled rotary angular displacement.

3. A revolving cutting press as defined in claim 1, wherein said tool sets of said insertion plates are uniformly distributed in said peripheral region of said insertion plates.

4. A revolving cutting press as defined in claim 1, wherein said upper revolving plate is provided with a plurality of openings, said insertion plates being rotatably accommodated in said openings of said upper revolving plate.

5. A revolving cutting press as defined in claim 1, wherein said lower revolving plate has a plurality of openings, said insertion plates being rotatably accommodated in said openings of said lower revolving plate.

6. A revolving cutting press as defined in claim 1, wherein said upper insertion plate is supported on said upper revolving plate and formed as a rotatable cylindrical body which is provided with an outer toothing for its rotation and has a plurality of peripheral openings which non-rotatably receive the punch holders with the punches of the tool sets so that the punches of said upper insertion plate extend through a stripper provided on said upper revolving plate.

7. A revolving cutting press as defined in claim 6; and further comprising a stripper shoe in which the stripper is rotatably received; and a stripper pin which is spring-loaded and surrounds said upper insertion plate in an axis-parallel arrangement so as to actuate said stripper shoe.

8. A revolving cutting press as defined in claim 6, wherein the stripper has a plurality of openings through which the punches extend.

9. A revolving cutting press as defined in claim 1, wherein said upper revolving plate has an opening, said upper insertion plate has a shaft end with an axis about which said upper insertion plate is rotatable in said opening of said upper revolving plate, said shaft end having a holding head which cooperates with said holding plate outside said working station and cooperates with the plunger in said working station.

10. A revolving cutting press as defined in claim 1, wherein said lower revolving plate accommodates a matrix shoe in which a toothed rim with an outer toothing is arranged, said insertion plates including a lower insertion plate being formed as a cylindrical body with peripherally arranged openings for non-rotatably accommodating the matrixes and which is coupled with said outer toothing of said toothed rim.

11. A revolving cutting press as defined in claim 10, wherein said lower insertion plate is coupled with said outer toothing of said toothed rim in a form-locking manner.

12. A revolving cutting press as defined in claim 1, wherein said insertion plates include a lower insertion plate arranged on said lower revolving plate and formed as a cylindrical body with peripherally arranged openings for non-rotatably accommodating the matrixes of the tool sets and with an outer toothing for rotatably driving said cylindrical body.

13. A revolving cutting press as defined in claim 1, wherein said insertion plates include said upper insertion plate arranged on said upper revolving plate and a lower insertion plate arranged on said lower revolving plate, said rotary drives being provided with toothings which are directly coupleable with said upper and lower insertion plates.

14. A revolving cutting press as defined in claim 1, wherein said insertion plates include said upper insertion plate arranged on one of said revolving plates and a lower insertion plate arranged on the other of said revolving plates said motor transmission units including transmissions supported on a respective one of said revolving plates.

15. A revolving cutting press as defined in claim 14, wherein each of said transmissions is formed as a toothed wheel supported on a respective one of said revolving plates.

16. A revolving cutting press as defined in claim 1, wherein said insertion plates include said upper insertion plate arranged on said upper revolving plate and a lower insertion plate arranged on said lower revolving plate, said motor-transmission units being motor-turnably arranged in the region of said working station on said machine base body.

17. A revolving cutting press as defined in claim 16; and further comprising a beam on which a respective one of said motor-transmission units is mounted; and a cylinder-piston unit cooperating with said beam so that by actuation of said cylinder-piston unit a connection between a respective one of said rotary drives and a respective one of said insertion plates is produced and released respectively.

18. A revolving cutting press as defined in claim 1, wherein said insertion plates include said upper insertion plate which is arranged on said upper revolving plate and formed as a cylindrical body provided with peripherally arranged openings for accommodating the punch holders which carry the punches of the tool sets so that the punches of said upper insertion plate extend through the stripper, said cylindrical body being provided with means for coupling to the one of rotary drives.

19. A revolving cutting pres as defined in claim 1, wherein said insertion plates include a lower insertion plate which is arranged on said lower revolving plate and formed as a cylindrical body, said cylindrical body being provided with peripheral openings for non-rotatably accommodating matrixes of the tool sets and also being provided with means for coupling to one of said rotary drives.

* * * * *